(12) United States Patent
Zhu et al.

(10) Patent No.: US 12,085,718 B2
(45) Date of Patent: Sep. 10, 2024

(54) SMART GLASSES, AND INTERACTION METHOD AND INTERACTION APPARATUS THEREOF

(71) Applicant: Huawei Technologies Co., Ltd., Shenzhen (CN)

(72) Inventors: Shuaishuai Zhu, Dongguan (CN); Jiuxing Wang, Dongguan (CN); Chunjing Mao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/042,100

(22) PCT Filed: Jul. 21, 2021

(86) PCT No.: PCT/CN2021/107634
§ 371 (c)(1),
(2) Date: Feb. 17, 2023

(87) PCT Pub. No.: WO2022/037355
PCT Pub. Date: Feb. 24, 2022

(65) Prior Publication Data
US 2023/0333384 A1    Oct. 19, 2023

(30) Foreign Application Priority Data
Aug. 21, 2020   (CN) .......................... 202010849479.1

(51) Int. Cl.
*G02B 27/01*    (2006.01)
*G06F 1/16*     (2006.01)
*G06F 1/3231*   (2019.01)
*G06F 3/01*     (2006.01)
*G06F 3/04815*  (2022.01)
(Continued)

(52) U.S. Cl.
CPC ......... *G02B 27/0172* (2013.01); *G06F 3/012* (2013.01); *G06F 3/04815* (2013.01); *G06F 3/04817* (2013.01); *G06T 3/40* (2013.01); *G02B 2027/0178* (2013.01)

(58) Field of Classification Search
USPC ............................................................ 345/8
See application file for complete search history.

(56) References Cited

U.S. PATENT DOCUMENTS

2012/0272230 A1*  10/2012  Lee .................. H04W 52/0258
                                                  717/173
2013/0021373 A1    1/2013  Vaught et al.
(Continued)

FOREIGN PATENT DOCUMENTS

CN    103941875 A   7/2014
CN    105320279 A   2/2016
(Continued)

*Primary Examiner* — Chineyere D Wills-Burns
(74) *Attorney, Agent, or Firm* — Conley Rose, P.C.

(57) ABSTRACT

Smart glasses, and an interaction method and an interaction apparatus thereof are provided. The interaction method includes: receiving a message sent by a communications device; displaying a prompt identifier of the message at an edge of a display area of the smart glasses; and performing, if the head of the user wearing the smart glasses rotates in the first direction, a screen sliding operation or page turning operation to display the detailed content of the message in the display area.

18 Claims, 9 Drawing Sheets

(51) Int. Cl.
    *G06F 3/04817*     (2022.01)
    *G06T 3/40*        (2024.01)

(56)        References Cited

U.S. PATENT DOCUMENTS

| | | | |
|---|---|---|---|
| 2013/0216108 A1* | 8/2013 | Hwang | G06V 40/16 |
| | | | 382/118 |
| 2014/0111427 A1* | 4/2014 | Lindley | G06F 3/011 |
| | | | 345/156 |
| 2016/0034042 A1* | 2/2016 | Joo | G02B 27/0093 |
| | | | 345/633 |
| 2016/0041048 A1* | 2/2016 | Blum | G06F 3/012 |
| | | | 73/774 |
| 2016/0063766 A1 | 3/2016 | Han et al. | |
| 2016/0077344 A1* | 3/2016 | Burns | G06F 3/012 |
| | | | 345/419 |
| 2018/0246565 A1* | 8/2018 | Moon | G06F 3/016 |
| 2018/0248991 A1 | 8/2018 | Ryu et al. | |
| 2018/0275834 A1* | 9/2018 | Yao | G09G 5/14 |
| 2019/0121522 A1* | 4/2019 | Davis | G06V 40/28 |
| 2020/0202629 A1* | 6/2020 | Sharma | G02B 27/0172 |
| 2020/0226814 A1 | 7/2020 | Tang et al. | |
| 2021/0240343 A1* | 8/2021 | Kobayashi | H04M 1/724097 |
| 2021/0349618 A1* | 11/2021 | Crowley | G06F 1/3287 |
| 2022/0155922 A1* | 5/2022 | Song | G06F 3/0486 |

FOREIGN PATENT DOCUMENTS

| | | |
|---|---|---|
| CN | 105573483 A | 5/2016 |
| CN | 105807798 A | 7/2016 |
| CN | 105955461 A | 9/2016 |
| CN | 106484103 A | 3/2017 |
| CN | 206440890 U | 8/2017 |
| CN | 107133002 A | 9/2017 |
| CN | 107515670 A | 12/2017 |
| CN | 107783707 A | 3/2018 |
| CN | 108803896 A | 11/2018 |
| CN | 109407858 A | 3/2019 |
| CN | 110096132 A | 8/2019 |
| CN | 110531859 A | 12/2019 |
| CN | 110716635 A | 1/2020 |
| EP | 3193240 A1 | 7/2017 |
| KR | 20160062799 A | 6/2016 |
| WO | 2018006280 A1 | 1/2018 |

* cited by examiner

SMART GLASSES, AND INTERACTION METHOD AND INTERACTION APPARATUS THEREOF

This is a National Stage of International Patent Application No. PCT/CN2021/107634 filed on Jul. 21, 2021, which claims priority to Chinese Patent Application No. 202010849479.1 filed on Aug. 21, 2020. Both of the aforementioned applications are hereby incorporated by reference in their entireties.

TECHNICAL FIELD

This application relates to the field of augmented reality technologies, and in particular, to smart glasses, and an interaction method and an interaction apparatus thereof.

BACKGROUND

Augmented reality (Augmented Reality. AR for short) is a new technology in which real world information and virtual world information are "seamlessly" integrated. Entity information that is originally difficult to experience within a specific time and space range of a real world is simulated and superimposed by using science and technology such as a computer, so that virtual information is applied to a real world, and is sensed by a sense organ of a human, to achieve experience of the sense organ beyond reality. A real environment and a virtual object are superimposed on a same image or in same space in real time.

An AR head-mounted display with a large angle of view, simultaneous localization and mapping (Simultaneous localization and mapping, SLAM), and the like may place virtual digital content at different locations in the real world. When a user moves or turns the head, a location of the digital content relative to the real world remains unchanged, so that very good virtual-reality integration experience can be provided to the user. However, such a product has a large volume, a high weight, and high power consumption, and cannot meet a long-time wearing requirement. However, for an AR head-mounted display without SLAM and with a small angle of view, for example, smart glasses, displayed content is fixed in a field of view of the user and moves with the head of the user. The digital content blocks a line of sight in which the user observes the real world. When the user is driving a vehicle or passing a road, blocking the line of sight increases a risk of occurrence of a traffic accident.

Therefore, for the AR head-mounted display without SLAM, how to display the virtual digital content without blocking, as much as possible, the line of sight in which the user observes the real world is an urgent problem that needs to be resolved. In addition, most smart glasses have no external power supply. To prolong a battery life, the smart glasses are in a sleep mode in most time periods. How to wake up the glasses in a simple and convenient interaction manner to improve user experience is also an urgent problem that needs to be resolved currently in the smart glasses field.

SUMMARY

Embodiments of this application provide smart glasses, and an interaction method and an interaction apparatus thereof, so that a user can interact with the smart glasses without using two hands, wake up the smart glasses, and control the smart glasses to display a message or application information. Operations are simple and convenient, thereby greatly improving user experience.

According to a first aspect, an embodiment of this application provides an interaction method for smart glasses. The interaction method includes: receiving a message sent by a communications device; displaying a prompt identifier of the message at an edge of a display area of the smart glasses, measuring, within a specified time period, a first angle obtained after a user wearing the smart glasses turns the head along a first direction, where the first angle is an angle, along the first direction, between an initial location and a current location obtained after the smart glasses are turned, and the initial location is a location at which the smart glasses are located when the user horizontally looks at the front; determining whether the first angle is greater than or equal to a first threshold; and if a determining result is yes, performing a screen flicking operation or a page flipping operation, to display, in the display area, detailed content obtained after the message is unfolded; or if the determining result is no, enabling the prompt identifier to disappear.

In the solution, after receiving the message, the glasses display only the prompt identifier of the message, for example, an icon. The user may choose to turn along the first direction, for example, lower the head down, to view the detailed content of the information, or make no action for a time period before the prompt identifier disappears. In this way, the user can flexibly select a time point for viewing or not viewing detailed content. That is, the smart glasses do not directly push the detailed content to the display area after receiving the message, but only display the prompt identifier of the message. In this way, a line of sight in which the user observes a real world is not blocked when the entire piece of information is directly pushed to the display area in front of an eye of the user, the line of sight of the user is not overly blocked, and the user does not pay much attention. The detailed content may be viewed through a simple head turning action. In this way, occurrence of a danger caused by blocking the line of sight of the user is avoided while convenience is provided to the user. The smart glasses are controlled, by measuring turning of the head of the user, to perform screen flicking or page flipping. Image switching manners may include but are not limited to fade-in fade-out, rotation, shutter, and the like, so that the user can interact with the smart glasses without using two hands. Operations are simple and convenient, thereby greatly improving user experience.

In a possible implementation, the prompt identifier is an icon or a word.

That is, in this implementation, after the smart glasses receive the message sent by the communications device, the icon of the message is displayed at the edge of the display area of the smart glasses, for example, a WeChat icon, a Messaging icon, and a missed call icon, so that the user can quickly learn of a specific received message or specific received information, and the icon does not draw much attention of the user, and does not block the line of sight of the user, thereby reducing a probability that a dangerous event occurs. Alternatively, the icon may be replaced with a word.

In a possible implementation, the interaction method further includes: waking up the smart glasses when the smart glasses are in a sleep mode and receive the message; and/or enabling the smart glasses to enter the sleep mode when it is determined that the first angle is less than the first threshold.

That is, in the implementation, for the smart glasses in the sleep mode, when receiving the message, if the first angle is greater than or equal to the first threshold, the smart glasses can be woken up and the prompt identifier of the message is displayed at the edge of the display area of the smart glasses. Then, if the user turns the head, so that the first angle is less than the first threshold, the prompt identifier disappears in the display area. In addition, the smart glasses may enter the sleep mode, so that the user can wake up the smart glasses without using the two hands and interact with the smart glasses. Operations are simple and convenient, thereby greatly improving user experience.

In a possible implementation, the interaction method further includes: when the detailed content of the message is not completely displayed in the display area, performing the screen flicking operation or the page flipping operation on the detailed content of the message along a second direction, to display a non-displayed part of the detailed content in the display area.

That is, in the implementation, when the detailed content of the message is long, after the user turns the head along the first direction, for example, downward, if the first angle is greater than or equal to the first threshold, a part of the detailed content obtained after the message is unfolded is displayed in the display area, and the screen flicking operation or the page flipping operation may be automatically performed on the detailed content of the message along the second direction, for example, upward, to display a remaining non-displayed part of the detailed content.

In a possible implementation, the interaction method further includes; when the detailed content of the message is not completely displayed in the display area, measuring a second angle obtained after the user turns the head along a third direction, where the second angle is an angle, along the third direction, between the initial location and a current location obtained after the smart glasses are turned; determining whether the second angle is greater than or equal to a second threshold; and if a determining result is yes, performing the screen flicking operation or the page flipping operation on the detailed content of the message along the third direction, to display a non-displayed part of the detailed content in the display area.

That is, in the implementation, when the detailed content of the message is long, after the user turns the head along the first direction, for example, downward, if the first angle is greater than or equal to the first threshold, a part of the detailed content obtained after the message is unfolded is displayed in the display area. Then, if the user turns the head along the third direction, for example, to the left/right, and the second angle obtained after turning is greater than or equal to the second threshold, the screen flicking operation or the page flipping operation to the left may be performed on the detailed content of the message, to display a remaining non-displayed part of the detailed content. In this case, a turning direction of the head of the user is the same as a direction of screen flicking or page flipping. It can be understood that the turning direction of the head of the user may alternatively be different from the direction of screen flicking or page flipping. For example, the user turns the head to the left, so that screen flicking or page flipping to the right is performed on the detailed content of the message.

According to a second aspect, an embodiment of this application provides an interaction method for smart glasses. The interaction method includes: when the smart glasses are in a sleep mode, measuring a first angle obtained after a user turns the head along a first direction, where the first angle is an angle, along the first direction, between an initial location and a current location obtained after the smart glasses are turned, the initial location is a location at which the smart glasses are located when the user horizontally looks at the front, and the smart glasses are in the sleep mode at the initial location; determining whether the first angle is greater than or equal to a first threshold; and if a determining result is yes, waking up a display screen of the smart glasses.

In the solution, the user turns the head along the first direction, for example, raises the head upward, to wake up the glasses, so that the user can wake up the smart glasses without using two hands, to facilitate interaction with the smart glasses. Operations are simple and convenient, thereby greatly improving user experience.

In a possible implementation, the interaction method further includes: displaying corresponding first application information in a display area of the smart glasses while the smart glasses are woken up, where the first application information is preset.

That is, in the implementation, for the smart glasses in the sleep mode, when the user turns the head along the first direction, the smart glasses may be woken up, and application information, for example, a time point and/or weather, may be displayed in the display area of the smart glasses. In addition, a type of application information displayed in the display area when the smart glasses are woken up may be preset based on a requirement.

In a possible implementation, the interaction method further includes: when the smart glasses are in a wakeup mode, measuring the first angle obtained after the user turns the head along a second direction, where the second direction is opposite to the first direction; determining whether the first angle is less than the first threshold; and if a determining result is yes, enabling the smart glasses to enter the sleep mode.

That is, in the implementation, for the smart glasses in the wakeup mode, when the smart glasses need to be enabled to enter the sleep mode, the user may turn the head in the second direction opposite to the first direction, for example, downward, so that the first angle is less than the first threshold, and the smart glasses are enabled to enter the sleep mode. In this way, the user can enable, without using the two hands, the smart glasses to enter the sleep mode. Operations are convenient and simple.

In a possible implementation, the interaction method further includes: turning off the smart glasses, so that the smart glasses are not woken up when the first angle is greater than or equal to the first threshold after the head turns.

That is, in the implementation, when the smart glasses do not need to be woken up, the smart glasses may be turned off in advance. In this way, the smart glasses are not woken up when the first angle is greater than or equal to the first threshold after the user turns the head, for example, raises the head upward.

In a possible implementation, the interaction method further includes: when the smart glasses are in the wakeup mode, measuring a second angle obtained after the user turns the head along a third direction, where the second angle is an angle, along the third direction, between the initial location and a current location obtained after the smart glasses are turned; determining whether the second angle is greater than or equal to a second threshold; and if a determining result is yes, performing a screen flicking operation or a page flipping operation along the third direction, to display detailed content of second application information or the first application information in the display area of the smart glasses.

That is, in the implementation, after the user raises the head to wake up the screen, the first application information may be displayed in the display area of the smart glasses. When the user turns the head along the third direction, for example, to the left/right, and the second angle obtained after turning is performed to the left/right is greater than or equal to the second threshold, a screen flicking operation to the left/right is performed. The operation is similar to a screen flicking operation on a mobile phone. In this case, content of a displayed message or the application information may be switched in the display area of the smart glasses. For example, a part of content of the message is displayed before screen flicking and the other part of content of the message is displayed after screen flicking. Alternatively, the first application information is displayed before screen flicking, for example, a time point, and the second application information is displayed after screen flicking, for example, weather.

According to a third aspect, an embodiment of this application provides an interaction method for smart glasses. The interaction method includes: when the smart glasses are in a wakeup mode, detecting a turning direction of the head of a user wearing the smart glasses, and performing screen flicking operations or page flipping operations in different directions based on the turning direction, to display different parts of a same message/a same piece of application information or different messages/different pieces of application information.

In the solution, the smart glasses are controlled, by detecting the turning direction of the head of the user, to perform screen flicking or page flipping. Specifically, a screen flicking operation or a page flipping operation may be performed when it is detected that the user turns the head. Alternatively, a screen flicking operation or a page flipping operation may be performed only when it is detected that a turning angle of the head of the user along a direction is greater than a specified threshold. In addition, different parts of a same message may be displayed. For example, an icon of a missed call is displayed before screen flicking, and details (including an incoming call time point, a caller, or the like) of the missed call are displayed after screen flicking. Alternatively, different messages are displayed. For example, a first unread SMS message is displayed before screen flicking, and a second unread SMS message is displayed after screen flicking. Alternatively, different parts of a same piece of application information are displayed. For example, weather of a current day is displayed before page flipping, and weather of tomorrow is displayed after paging flipping. Alternatively, different pieces of application information are displayed. For example, a time point is displayed before page flipping, and weather is displayed after page flipping. In this way, the user can control the smart glasses without using two hands. Operations are simple and convenient, thereby greatly improving user experience.

In a possible implementation, the interaction method further includes: waking up the smart glasses in one of the following manners: using a voice instruction, tapping a touchpad, and performing a blinking action.

That is, in the implementation, the smart glasses may be woken up by using the voice instruction; or the smart glasses may be woken up by tapping the touchpad of the smart glasses; or the smart glasses may be woken up by performing a blinking action. Certainly, it can be understood that the smart glasses may be woken up in another manner. For example, the smart glasses are woken up by performing a head raising action as mentioned above.

In a possible implementation, the turning direction includes raising the head up, lowering the head down, turning the head to the left, turning the head to the right, swinging the head to the left, and swinging the head to the right. The screen flicking operations in different directions include performing screen flicking upward, performing screen flicking downward, performing screen flicking to the left, performing screen flicking to the right, performing screen flicking toward an upper left corner, and performing screen flicking toward an upper right corner. The plurality of turning directions are in a one-to-one correspondence with the plurality of screen flicking operations.

That is, in the implementation, the screen flicking operations in the different directions may be performed based on the different turning directions of the head of the user. Specifically, the one-to-one correspondence between the different turning directions and the screen flicking operations in the different directions may be set based on a requirement. For example, the head is raised up to implement an upward screen flicking operation, and the head is lowered down to implement a downward screen flicking operation.

According to a fourth aspect, an embodiment of this application provides an interaction apparatus for smart glasses. The interaction apparatus includes: a receiving module, configured to receive a message sent by a communications device; a display module, configured to display a prompt identifier of the message at an edge of a display area of the smart glasses; a measurement module, configured to measure, within a specified time period, a first angle obtained after a user wearing the smart glasses turns the head along a first direction, where the first angle is an angle, along the first direction, between an initial location and a current location obtained after the smart glasses are turned, and the initial location is a location at which the smart glasses are located when the user horizontally looks at the front; and a determining module, configured to determine whether the first angle is greater than or equal to a first threshold, where the display module is further configured to: when the determining module determines that the first angle is greater than or equal to the first threshold, perform a screen flicking operation or a page flipping operation to display, in the display area, detailed content obtained after the message is unfolded; and when the determining module determines that the first angle is less than the first threshold, enable the prompt identifier to disappear.

In a possible implementation, the prompt identifier is an icon or a word.

In a possible implementation, the interaction apparatus further includes: a wakeup module, configured to wake up the smart glasses when the smart glasses are in a sleep mode and receive the message; and/or a sleeping module, configured to: when the determining module determines that the first angle is less than the first threshold, enable the smart glasses to enter the sleep mode.

In a possible implementation, the interaction apparatus further includes: the display module is further configured to: when the detailed content of the message is not completely displayed in the display area, perform the screen flicking operation or the page flipping operation on the detailed content of the message along a second direction, to display a non-displayed part of the detailed content in the display area.

In a possible implementation, the interaction apparatus further includes: the measurement module is further configured to: when the detailed content of the message is not completely displayed in the display area, measure a second angle obtained after the user turns the head along a third direction, where the second angle is an angle, along the third direction, between the initial location and a current location obtained after the smart glasses are turned; the determining module is further configured to determine whether the second angle is greater than or equal to a second threshold;

and the display module is further configured to: when the determining module determines that the second angle is greater than or equal to the second threshold, perform the screen flicking operation or the page flipping operation on the detailed content of the message along the third direction, to display a non-displayed part of the detailed content in the display area.

According to a fifth aspect, an embodiment of this application provides an interaction apparatus for smart glasses. The interaction apparatus includes: a measurement module, configured to: when the smart glasses are in a sleep mode, measure a first angle obtained after a user turns the head along a first direction, where the first angle is an angle, along the first direction, between an initial location and a current location obtained after the smart glasses are turned, the initial location is a location at which the smart glasses are located when the user horizontally looks at the front, and the smart glasses are in the sleep mode at the initial location; a determining module, configured to determine whether the first angle is greater than or equal to a first threshold; and a wakeup module, configured to wake up a display screen of the smart glasses when the determining module determines that the first angle is greater than or equal to the first threshold.

In a possible implementation, the interaction apparatus further includes: a display module, configured to display corresponding first application information in a display area while the smart glasses are woken up, where the first application information is preset.

In a possible implementation, the interaction apparatus further includes: the measurement module is further configured to: when the smart glasses are in a wakeup mode, measure a first angle obtained after the user turns the head along a second direction, where the second direction is opposite to the first direction; the determining module is further configured to determine whether the first angle is less than the first threshold; and a sleeping module, configured to: when the determining module determines that the first angle is less than the first threshold, enable the smart glasses to enter the sleep mode.

In a possible implementation, the interaction apparatus further includes: a turn-off module, configured to turn off the smart glasses, so that the smart glasses are not woken up when the first angle is greater than or equal to the first threshold after the head turns.

In a possible implementation, the interaction apparatus further includes: the measurement module is further configured to: when the smart glasses are in the wakeup mode, measure a second angle obtained after the user turns the head along a third direction, where the second angle is an angle, along the third direction, between the initial location and a current location obtained after the smart glasses are turned, the determining module is further configured to determine whether the second angle is greater than or equal to a second threshold; and the display module is further configured to perform a screen flicking operation or a page flipping operation along the third direction when the determining module determines that the second angle is greater than or equal to the second threshold, to display detailed content of second application information or the first application information in the display area of the smart glasses.

According to a sixth aspect, an embodiment of this application provides an interaction apparatus for smart glasses. The interaction apparatus includes: a detection module, configured to: when the smart glasses are in a wakeup mode, detect a turning direction of the head of a user wearing the smart glasses; and a display module, configured to perform screen flicking operations or page flipping operations in different directions based on the turning direction, to display different parts of a same message/a same piece of application information or different messages/different pieces of application information.

In a possible implementation, the smart glasses are woken up in one of the following manners: using a voice instruction, tapping a touchpad, and performing a blinking action.

In a possible implementation, the turning direction includes raising the head up, lowering the head down, turning the head to the left, turning the head to the right, swinging the head to the left, and swinging the head to the right. The screen flicking operations or page flipping operations in different directions include performing screen flicking upward, performing screen flicking downward, performing screen flicking to the left, performing screen flicking to the right, performing screen flicking toward an upper left corner, and performing screen flicking toward an upper right corner. The plurality of turning directions are in a one-to-one correspondence with the plurality of screen flicking operations or page flipping operations.

According to a seventh aspect, an embodiment of this application provides smart glasses. The smart glasses include the interaction apparatus for smart glasses provided in the fourth aspect, the fifth aspect, or the sixth aspect.

According to an eighth aspect, an embodiment of this application provides smart glasses. The smart glasses include a glasses body, and an inertial measurement unit, a processor, and a display that are disposed on the glasses body. The inertial measurement unit is configured to measure a specified angle, along a specified direction, between an initial location and a current location of the smart glasses. The initial location is a location at which the smart glasses are located when a user horizontally looks at the front. The processor is configured to determine content of a to-be-displayed message/to-be-displayed application information based on the specified direction and the specified angle. The display is configured to display the content of the message/application information determined by the processor.

According to a ninth aspect, an embodiment of this application provides smart glasses, including a memory, a processor, and a computer program that is stored in the memory and that can be run on the processor. When the processor executes the computer program, the method provided in one of the first aspect, the second aspect, and the third aspect is implemented.

According to a tenth aspect, an embodiment of this application provides a computer-readable storage medium. The computer-readable storage medium stores a computer program, and when the computer program is executed, the method provided in one of the first aspect, the second aspect, and the third aspect is implemented.

According to an eleventh aspect, an embodiment of this application provides a computer program product including instructions. When the instructions are run on a computer, the computer is enabled to implement the method provided in one of the first aspect, the second aspect, and the third aspect.

In embodiments of this application, the smart glasses are controlled, by measuring turning of the head of the user, to perform screen flicking or page flipping, so that the user can interact with or control the smart glasses without using two hands. Operations are simple and convenient, thereby greatly improving user experience. Specifically, after receiving the message, the glasses display only the prompt identifier of the message, for example, an icon. The user may choose to turn along the first direction, for example, lower the head down, to perform a screen flicking operation or a page flipping operation to view the detailed content of the information, or perform no operation for a time period before the prompt identifier disappears. In this way, the user can choose to view or not to view the detailed content. That is, in embodiments of this application, the smart glasses do not directly push the detailed content to the display area after receiving the message, but only display the prompt identifier of the message. In this way, the line of sight in which the user observes the real world is not blocked when the entire piece of information is directly pushed to the display area in front of the eye of the user, and the line of sight of the user is not overly blocked. Then the detailed content may be viewed through a simple operation of lowering the head down and/or a simple operation of turning the head. In this way, occurrence of a danger caused by blocking the line of sight of the user is avoided while convenience is provided to the user.

DESCRIPTION OF EMBODIMENTS

Figure 1:
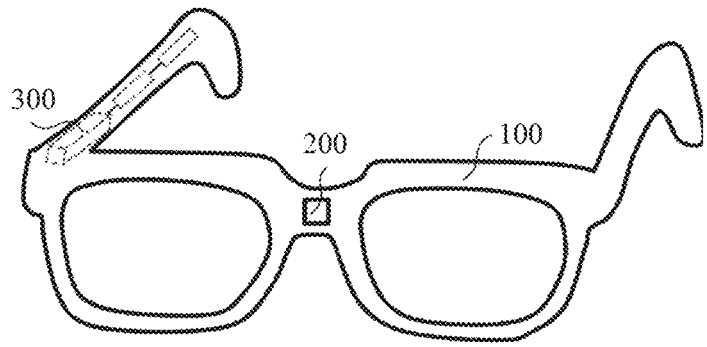
FIG. 1 is a schematic diagram of a structure of smart glasses according to an embodiment of this application.

The following describes technical solutions in embodiments of this application with reference to the accompanying drawings in embodiments of this application.

As a computer graphics technology develops, an augmented reality (Augmented Reality, AR) technology is gradually applied to work and life of people. In the AR technology, a simulation is performed by using a computer, to generate one piece of three-dimensional (three-dimensional, 3D) digital content. A user may observe a real world outside while observing the digital content. That is, the digital content and the real world are superimposed together. To better integrate the digital content with the real world, an AR head-mounted display requires a large angle of view, a 3D space reconstruction capability, a user-friendly interaction manner, and the like. Consequently, a product has a large volume, a high weight, and high power consumption, and cannot meet a long-time wearing requirement. Another type of AR product sacrifices some of the foregoing indicators to achieve purposes of lightness and long-time wearing. For example, an angle of view is only approximately 20°, or the AR product does not have the 3D reconstruction capability. Such a type of AR product is also referred to as smart glasses, has only a simple information reminding function, a small volume, and a low weight, and can be worn by a user for a long time period.

A 3D reconstruction technology in the AR head-mounted display is also referred to as simultaneous localization and mapping (Simultaneous localization and mapping, SLAM). The AR head-mounted display with SLAM may place virtual digital content at different locations in the real world. When the user moves or turns the head, a location of the digital content relative to the real world remains unchanged, so that very good virtual-reality integration experience is provided to the user. However, for an AR head-mounted display without SLAM, for example, the smart glasses, displayed content is fixed in a field of view of the user, and the displayed content moves with the head of the user. The digital content may block a line of sight in which the user observes the real world. When the user is driving a vehicle or crossing a road, blocking the line of sight poses a risk of causing a traffic accident. In addition, an integrated design is used for most smart glasses. That is, there is no external power supply. To prolong a battery life, the smart glasses are currently in a sleep mode in most time periods. Therefore, a wake-up operation needs to be performed first when the smart glasses need to be used.

To better understand a process of controlling the smart glasses, two interaction manners for smart glasses are described below.

(1) Interaction is performed by using a touchpad. When a user wants to view information, for example, a time point, weather, or news, the user needs to tap a touchpad on a glass arm of the smart glasses by using a finger, to wake up the glasses, and may perform interaction through one-finger or two-finger tapping and flicking. When the glasses are connected to a mobile phone through Bluetooth, information received by the mobile phone is synchronously pushed to the glasses for display, and the user may also perform an operation by using the touchpad, for example, deleting, replying, and marking "Read". The interaction manner has the following problems: 1. When the user wants to view common information, for example, a time point, weather, or a calendar, the user needs to wake up the glasses by tapping the touchpad. In an operation process, the glasses shakes, thereby affecting observing an outside scenario by the user. In addition, a hand action of the user is required, and an operation is inconvenient. 2. When the information received by the mobile phone is pushed to the glasses for display, the user may be performing an operation that requires concentration, for example, may be driving, crossing a road, or chopping a vegetable. Information that suddenly appears blocks a line of sight in which the user observes the real world, and there is a risk of harming safety of the user.

(2) The smart glasses are controlled by using a ring, and the glasses and the ring need to be used together. A joystick is disposed on the ring, and a user may control the glasses by using the joystick. In the solution, the user needs to wear an additional ring to control the glasses, a hand of the user is affected, and an operation is inconvenient. In addition, the ring is easily lost or damaged, thereby affecting experience.

Because the AR head-mounted display without SLAM cannot achieve good virtual-reality integration, a dangerous accident occurs when a line of sight of the user is blocked. However, the operation is inconvenient in a manner of interacting with the smart glasses by using the touchpad or the ring, thereby affecting user experience. Therefore, the present invention provides smart glasses, and an interaction method and an interaction apparatus thereof, which is applicable to an AR head-mounted display without SLAM. Therefore, a screen flicking operation and a page flipping operation can be performed or the smart glasses can be woken up based on a turning angle of the smart glasses along a specified direction, and the smart glasses are enabled to enter a sleep mode, so that the user interacts with the smart glasses without using two hands. Operations are simple and convenient, thereby greatly improving user experience.

FIG. 1 is a schematic diagram of a structure of smart glasses according to an embodiment of this application. As shown in FIG. 1, the smart glasses include a glasses body 100, and an inertial measurement unit (Inertial measurement unit, IMU) 200, a processor 300, and a display that are disposed on the glasses body 100. The IMU is a sensor that measures a three-axis attitude angle of an object. The IMU may be one or a combination of sensors such as an accelerometer, a gyroscope, and a magnetometer. The inertial measurement unit 200 is configured to measure a specified angle, along a specified direction, between an initial location and a current location of the smart glasses. The initial location is a location at which the smart glasses are located when a user horizontally looks at the front. The processor 300 is configured to determine, based on the specified direction and the specified angle, content of a to-be-displayed message/to-be-displayed application information. The display is configured to display the content of the message/application information determined by the processor 300. Turning angles of the head of the user along different directions can be measured by using the IMU, and the processor transmits a corresponding instruction to the smart glasses based on the turning angle of the head of the user, so that the display displays corresponding information content, thereby interacting with the smart glasses by the user without using two hands.

The interaction method for smart glasses provided in embodiments of this application is described below in detail.

Figure 2:
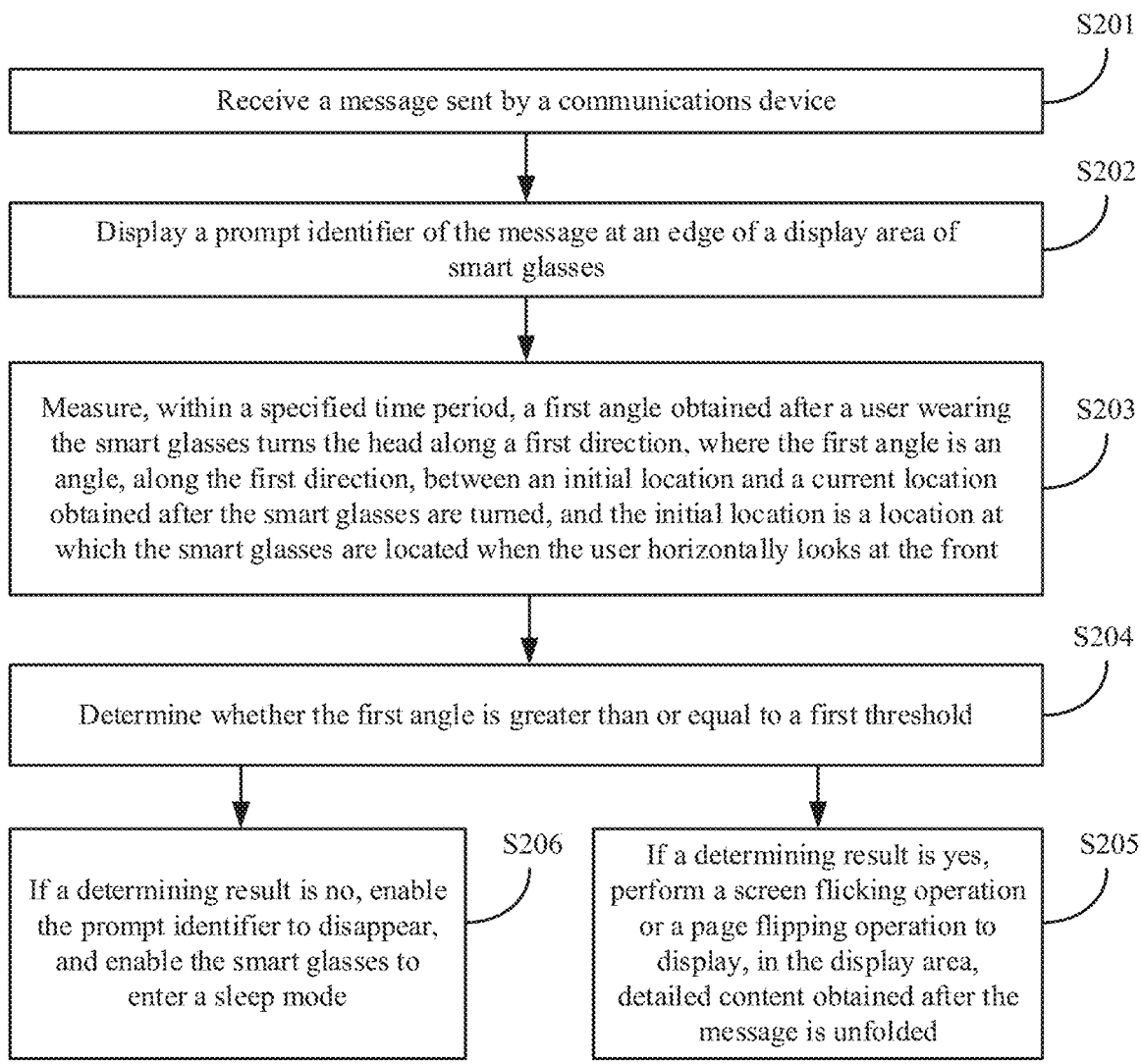
FIG. 2 is a flowchart of an interaction method for smart glasses according to a first embodiment of this application.
Figure 3:
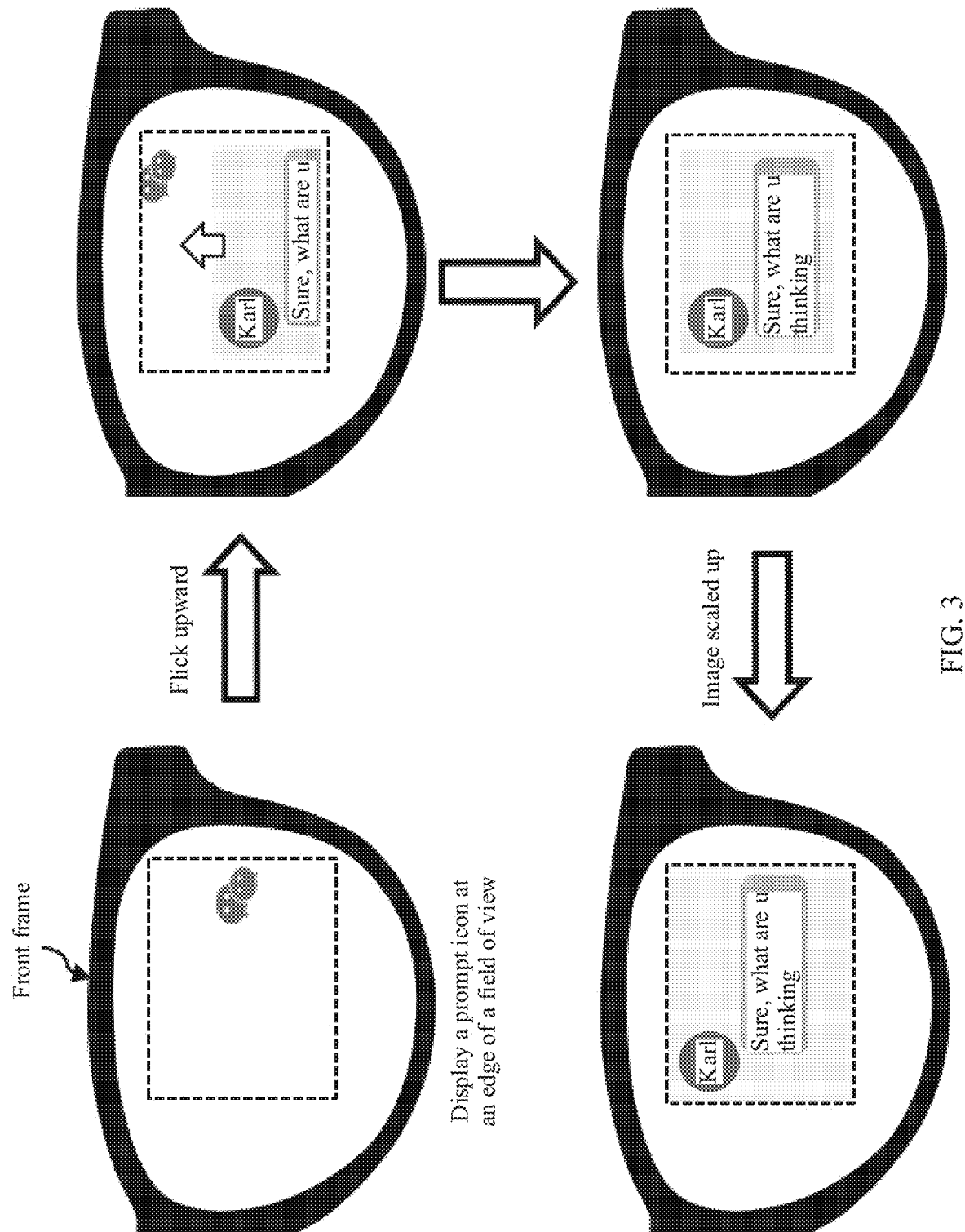
FIG. 3 is a diagram of a process of the interaction method shown in FIG. 2.

FIG. 2 is a flowchart of an interaction method for smart glasses according to a first embodiment of this application. FIG. 3 is a diagram of a process of the interaction method shown in FIG. 2. As shown in FIG. 2, the interaction method includes the following steps.

Step S201: Receive a message sent by a communications device.

The smart glasses may be woken up when the smart glasses are in a sleep mode and receive the message.

Step S202: Display a prompt identifier of the message at an edge of a display area of the smart glasses. As shown in FIG. 3, when the smart glasses receive the message sent by the communications device, the prompt identifier is displayed only at the edge of the display area/at an edge of a field of view, that is, the prompt identifier may be an icon. It can be understood that the prompt identifier may alternatively be other content. For example, the prompt identifier is a word.

Step S203: Measure, within a specified time period, a first angle obtained after a user wearing the smart glasses turns the head along a first direction, for example, downward, where the first angle is an angle, along the first direction, between an initial location and a current location obtained after the smart glasses are turned, and the initial location is a location at which the smart glasses are located when the user horizontally looks at the front.

Step S204: Determine whether the first angle is greater than or equal to a first threshold.

Step S205: If a determining result is yes, perform a screen flicking operation or a page flipping operation to display, in the display area, detailed content obtained after the message is unfolded, as shown in FIG. 3.

Step S206: If a determining result is no, that is, when the first angle is less than the first threshold, the prompt identifier disappears, and the smart glasses may enter a sleep mode. That is, when the first angle is less than the first threshold, the prompt identifier disappears. In this case, the smart glasses may still be in a wakeup mode. Alternatively, when the first angle is less than the first threshold, the smart glasses enter the sleep mode, and the prompt identifier disappears. Optionally, the prompt identifier may still be seen when the smart glasses are woken up again.

Specifically, when the smart glasses in the sleep mode receive the message such as information, a social software reminder, or an incoming call sent by the communications device, for example, a mobile phone, the smart glasses are automatically woken up. Different from a solution of directly displaying the detailed content in the display area, in this embodiment of this application, after the message/a trigger signal from the communications device is received, only a simple prompt identifier is displayed at an edge location of the display area of the smart glasses, for example, an icon of Messaging, Email, a social software, or Phone is displayed, so that the user can quickly determine a type of the received message without drawing too much attention from the user. Then, in a specified time period in which the prompt identifier is displayed, if it is measured that the first angle obtained after the user turns the head along the first direction is greater than or equal to the first threshold, the detailed content of the message may be captured from a system of the smart glasses, for example, content of an SMS message or an email, details of a sender, or details of a caller. A display image is generated in a preset manner, and the detailed content obtained after the message is unfolded is displayed in the display area. If it is measured, within the specified time period, that the first angle obtained after the user turns the head along the first direction is less than the first threshold, the prompt identifier disappears, and the smart glasses may enter the sleep mode.

In addition, when the detailed content of the message is not completely displayed in the display area, the screen flicking operation or the page flipping operation may be performed on the detailed content of the message along a second direction, for example, upward, to display a non-displayed part of the detailed content in the display area. That is, when the detailed content of the message is long, after the user turns the head along the first direction, for example, downward, if the first angle is greater than or equal to the first threshold, a part of the detailed content obtained after the message is unfolded is displayed in the display area, and the screen flicking operation or the page flipping operation may be automatically performed on the detailed content of the message upward, to display a remaining non-displayed part of the detailed content. Specifically, as shown in FIG. 3, if it is detected, within the specified time period, that the first angle is greater than or equal to the first threshold, an original image may be scaled down and screen flicking is performed upward. As the original displayed image is flicked out, a displayed image obtained after screen flicking is flicked in until the original image is flicked out completely. Finally, the displayed image obtained after screen flicking is scaled up to a normal state.

Alternatively, when the detailed content of the message is not completely displayed in the display area, a second angle obtained after the user turns the head along a third direction may be measured, for example, to the left or to the right. The second angle is an angle, along the third direction, between the initial location and a current location obtained after the smart glasses are turned. Whether the second angle is greater than or equal to a second threshold is determined; and if a determining result is yes, a screen flicking operation or a page flipping operation is performed on the detailed content of the message along the third direction, to display a non-displayed part of the detailed content in the display area. That is, when the detailed content of the message is long, after the user turns the head along the first direction, for example, downward, if the first angle is greater than or equal to the first threshold, a part of the detailed content obtained after the message is unfolded is displayed in the display area. In this case, if the user turns the head along a third direction, for example, to the left/right, and the second angle obtained after turning is greater than or equal to the second threshold, a screen flicking operation or a page flipping operation to the left/right may be performed on the detailed content of the message, to display the remaining non-displayed part of the detailed content.

According to the interaction method for smart glasses in the first embodiment of this application, after receiving the message, the glasses display only the prompt identifier of the message, for example, an icon. The user may choose to turn along the first direction, for example, lower the head down, to perform the screen flicking operation or the page flipping operation to view the detailed content of the information, or perform no operation for a time period before the prompt identifier disappears. In this way, the user can choose to view or not to view the detailed content. That is, the smart glasses do not directly push the detailed content to the display area after receiving the information, but only display the icon of the message. In this way, a line of sight in which the user observes a real world is not blocked when the entire message is directly pushed to the display area in front of an eye of the user, and the line of sight of the user is not overly blocked. Then the detailed content may be viewed through a simple operation of lowering the head down and/or a simple operation of turning the head. In this way, occurrence of a danger caused by blocking the line of sight of the user is avoided while convenience is provided to the user. The smart glasses are controlled, by measuring turning of the head of the user, to perform screen flicking or page flipping. Image switching manners may include but are not limited to fade-in fade-out, rotation, shutter, and the like, so that the user can interact with the smart glasses without using two hands. Operations are simple and convenient, thereby greatly improving user experience.

Figure 4:
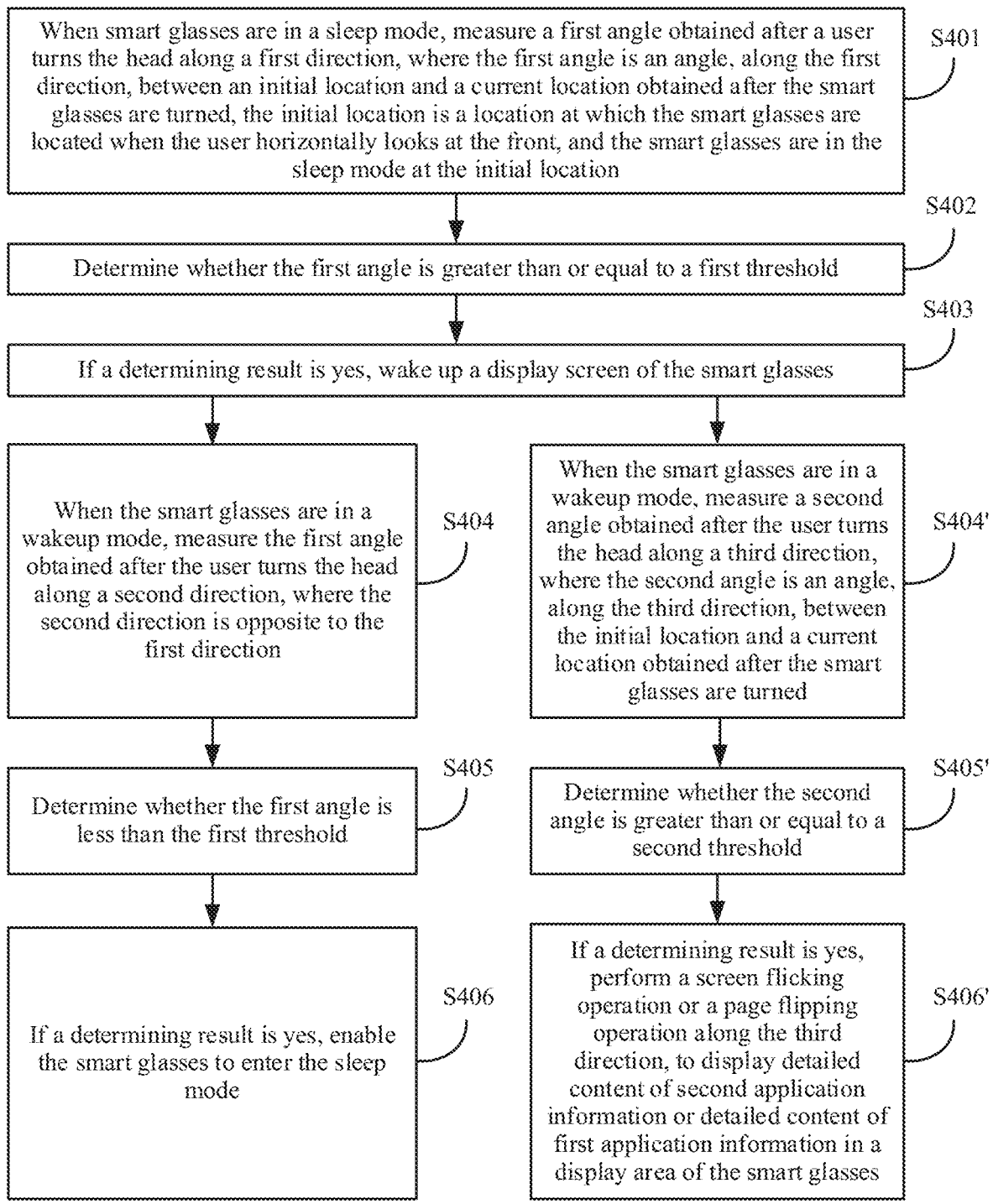
FIG. 4 is a flowchart of an interaction method for smart glasses according to a second embodiment of this application.

FIG. 4 is a flowchart of an interaction method for smart glasses according to a second embodiment of this application. As shown in FIG. 4, the interaction method includes the following steps.

Step S401: When the smart glasses are in a sleep mode, measure a first angle obtained after a user turns the head along a first direction, for example, raises the head up, where the first angle is an angle, along the first direction, between an initial location and a current location obtained after the smart glasses are turned, the initial location is a location at which the smart glasses are located when the user horizontally looks at the front, and the smart glasses are in the sleep mode at the initial location.

Step S402: Determine whether the first angle is greater than or equal to a first threshold.

Step S403: If a determining result is yes, wake up a display screen of the smart glasses.

In addition, corresponding first application information may be displayed in a display area of the smart glasses while the smart glasses are woken up. The first application information is preset. That is, a type (for example, a time point or weather) or content (for example, detailed content or brief content) of an application displayed in the display area when the smart glasses are woken up may be preset based on a requirement. In addition, the smart glasses are turned off, for example, by tapping a touchpad, so that the smart glasses may not be woken up when the first angle is greater than or equal to the first threshold after the head turns.

Figure 5:
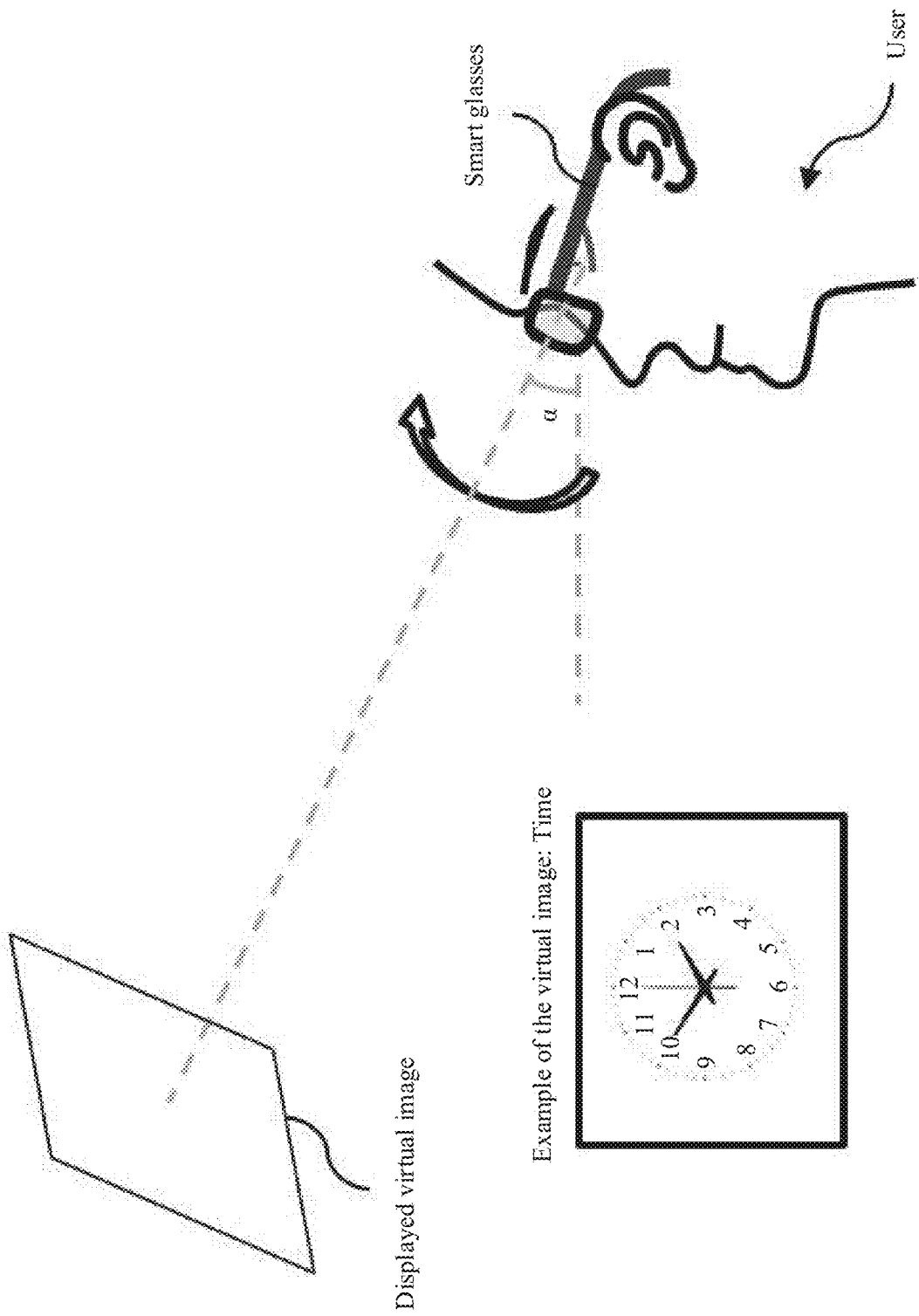
FIG. 5 is a schematic diagram of waking up smart glasses in the interaction method shown in FIG. 4.

FIG. 5 is a schematic diagram of waking up smart glasses in the interaction method shown in FIG. 4. When the user normally and horizontally looks at the front, the smart glasses are at the initial location and in the sleep mode, and no image is displayed. As shown in FIG. 5, when the user raises the head up along the first direction, a head raising action of the user is measured, and a first angle α obtained after the user raises the head up is calculated. When the first angle α is greater than or equal to the first threshold, the smart glasses are woken up. In addition, information about at least one of a time point, weather, and an item reminder may be captured, in a preset manner, from the smart glasses or another device capable of communicating with the smart glasses such as a mobile phone or a tablet, and to-be-displayed content of the information is generated and sent to the display area for display. As shown in FIG. 5, the corresponding first application information displayed in the display area of the smart glasses is a time point. When the first angle α is less than the first threshold, the smart glasses continue being in the sleep mode.

If the awake smart glasses need to be turned off even if the smart glasses are in the sleep mode, as shown in FIG. 4, the following steps may be performed.

Step S404: When the smart glasses are in a wakeup mode, measure a first angle obtained after the user turns the head along a second direction, for example, lowers the head down, where the second direction is opposite to the first direction.

Step S405: Determine whether the first angle is less than the first threshold.

Step S406: If a determining result is yes, enable the smart glasses to enter the sleep mode.

That is, after the user raises the head up to wake up the screen, when the first angle is less than the first threshold when the user lowers the head down to horizontally look at the front, the smart glasses may be enabled to enter the sleep mode.

In addition, when other application information needs to be viewed, or when the first application information displayed in the display area is a prompt summary during wakeup, and detailed content of the first application information needs to be viewed, the following steps may be performed.

Step S404': Measure a second angle obtained after the user turns the head along a third direction, for example, to the left/right, where the second angle is an angle, along the third direction, between the initial location and a current location obtained after the smart glasses are turned.

Step S405': Determine whether the second angle is greater than or equal to a second threshold.

Step S406': If a determining result is yes, perform a screen flicking operation or a page flipping operation along the third direction, to display detailed content of the second application information or the detailed content of the first application information in the display area of the smart glasses.

That is, after the user raises the head to wake up the screen, the first application information is displayed in the display area of the smart glasses. Then, the user turns the head along the third direction, for example, to the left/right. When the second angle obtained after turning is performed to the left/right is greater than or equal to the second threshold, screen flicking or page flipping is performed to the left/right on the smart glasses, so that the detailed content of the first application information and/or the second application information may be displayed in the display area of the smart glasses. For example, a summary of an unread message is displayed before screen flicking or page flipping, and detailed content of the message is displayed after screen flicking or page flipping. Alternatively, the first application information is displayed before screen flicking or page flipping, for example, a time point, and the second application information is displayed after screen flicking or page flipping, for example, weather.

Figure 6:
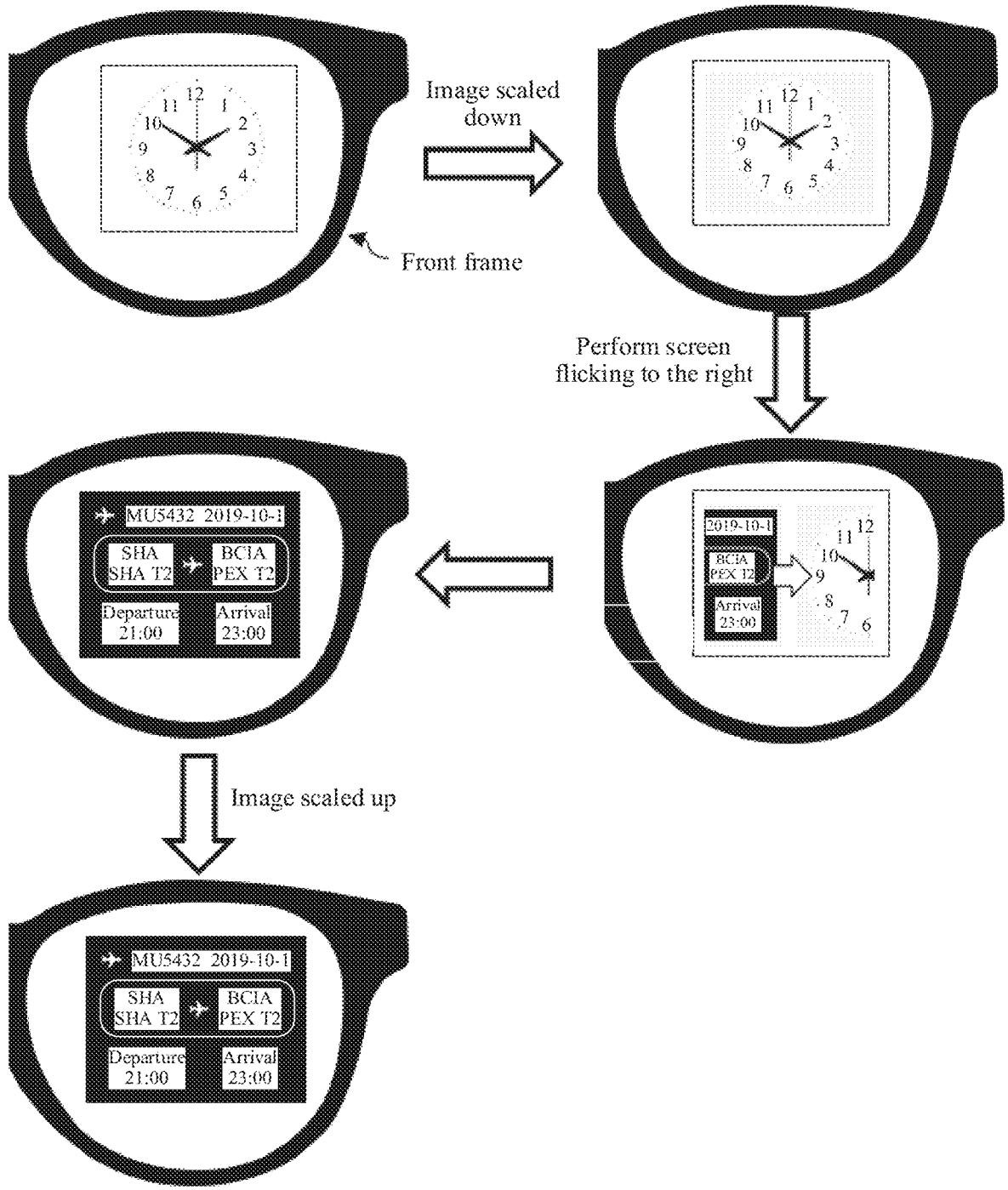
FIG. 6 is a diagram of a process of a screen flicking operation in the interaction method shown in FIG. 4.

FIG. 6 is a diagram of a process of a screen flicking operation in the interaction method shown in FIG. 4. Screen flicking to the right is used as an example for description. As shown in FIG. 6, a time point is displayed before screen flicking. During screen flicking, an original displayed image is first scaled down by a specific ratio. Then the image is flicked to the right. As the original displayed image is flicked out, a displayed image obtained after screen flicking is flicked in until the original image is flicked out completely. Finally, the displayed image obtained after screen flicking is scaled up to a normal state. After screen flicking, information about an air ticket is displayed. A black dotted line indicates a range of the display area, and may not be displayed when the user actually uses the smart glasses.

In this embodiment, no image is displayed on the smart glasses when the user normally works and lives in a state of horizontally looking at the front. However, the user can see a screen with common information only by raising the head up. When the user raises the head up, but does not want to wake up the smart glasses, the display screen of the smart glasses may be turned off by tapping the touchpad. In addition, the user may adjust the first threshold and the second threshold, to adapt to a work habit of the user, thereby minimizing impact on the user when the smart glasses are used. In addition, the smart glasses may further collect operation data of the user and adapt to an operation habit of the user through learning.

According to the interaction method for smart glasses in the second embodiment of this application, the user turns the head along the first direction, for example, raises the head up, so that the glasses can be woken up; turns the head along the second direction, for example, lowers the head down, to horizontally look at the front, so that the glasses in the wakeup mode can be enabled to enter the sleep mode; and can turn along the third direction, for example, turn the head to the left/right, so that screen flicking or page flipping can be performed, to help the user view the common information, for example, a time point, weather, or a to-do item. In this way, the user can interact with the smart glasses without using the two hands. Operations are simple and convenient, thereby greatly improving user experience.

Figure 7:
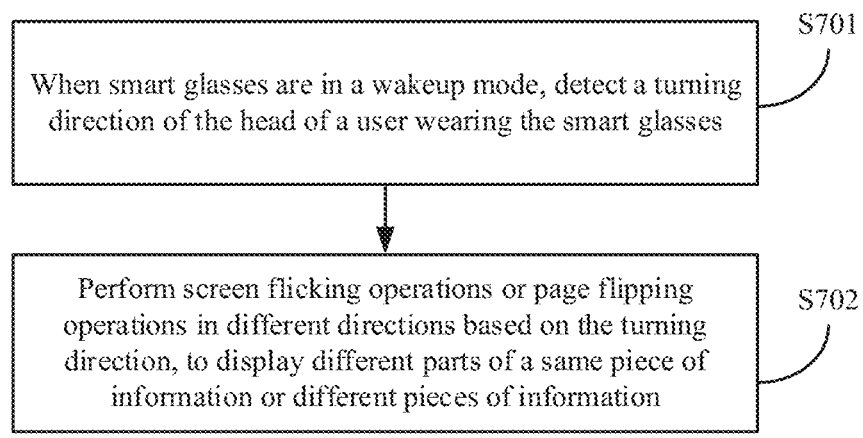
FIG. 7 is a flowchart of an interaction method for smart glasses according to a third embodiment of this application.

FIG. 7 is a flowchart of an interaction method for smart glasses according to a third embodiment of this application. As shown in FIG. 7, the interaction method includes the following steps.

Step S701: When the smart glasses are in a wakeup mode, detect a turning direction of the head of a user wearing the smart glasses. The smart glasses may be woken up in one of the following manners: using a voice instruction, tapping a touchpad, and performing a blinking action.

Step S702: Perform screen flicking operations or page flipping operations in different directions based on the turning direction, to display different parts of a same message/a same piece of application information or different messages/different pieces of application information. The "message" herein may be sent by a communications device to the smart glasses, for example, an SMS message or a phone message. The "application information" herein may be information about the smart glasses, for example, information about an application installed on the smart glasses.

The turning direction may include raising the head up, lowering the head down, turning the head to the left, turning the head to the right, swinging the head to the left, and swinging the head to the right. The screen flicking operations in different directions include performing screen flicking upward, performing screen flicking downward, performing screen flicking to the left, performing screen flicking to the right, performing screen flicking toward an upper left corner, and performing screen flicking toward an upper right corner. The plurality of turning directions are in a one-to-one correspondence with the plurality of screen flicking operations. In addition, an image may be switched in a plurality of manners, for example, fade-in fade-out, rotation, and shutter.

That is, when the smart glasses are woken up, the user may control, through an action of the head, the smart glasses to perform screen flicking or page flipping. Screen flicking is used as an example. Specifically, the user may perform a screen flicking operation upward by raising the head up, a screen flicking operation downward by lowering the head down, a screen flicking operation to the left by turning the head to the left, a screen flicking operation to the right by turning the head to the right, a screen flicking operation toward the upper left corner by swinging the head to the left, and a screen flicking operation toward the upper right corner by swinging the head to the right.

Figure 8:
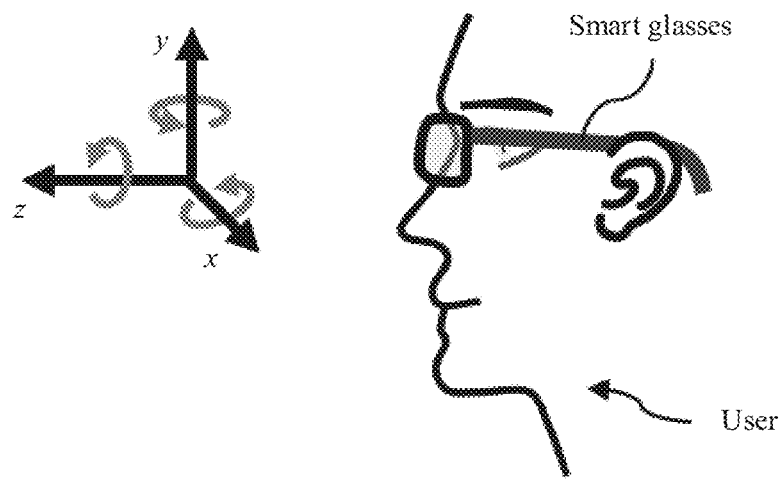
FIG. 8 is a schematic diagram of a turning direction existing when a user wearing smart glasses turns the head around three axes.

FIG. 8 is a schematic diagram of a turning direction existing when a user wearing smart glasses turns the head around three axes. As shown in FIG. 8, a positive direction of the y-axis is a vertically upward direction, a positive direction of the z-axis is a forward direction when the user horizontally looks at the front, and a positive direction of the x-axis is perpendicular to the y-axis and z-axis and faces the left ear of the user.

Figure 9:
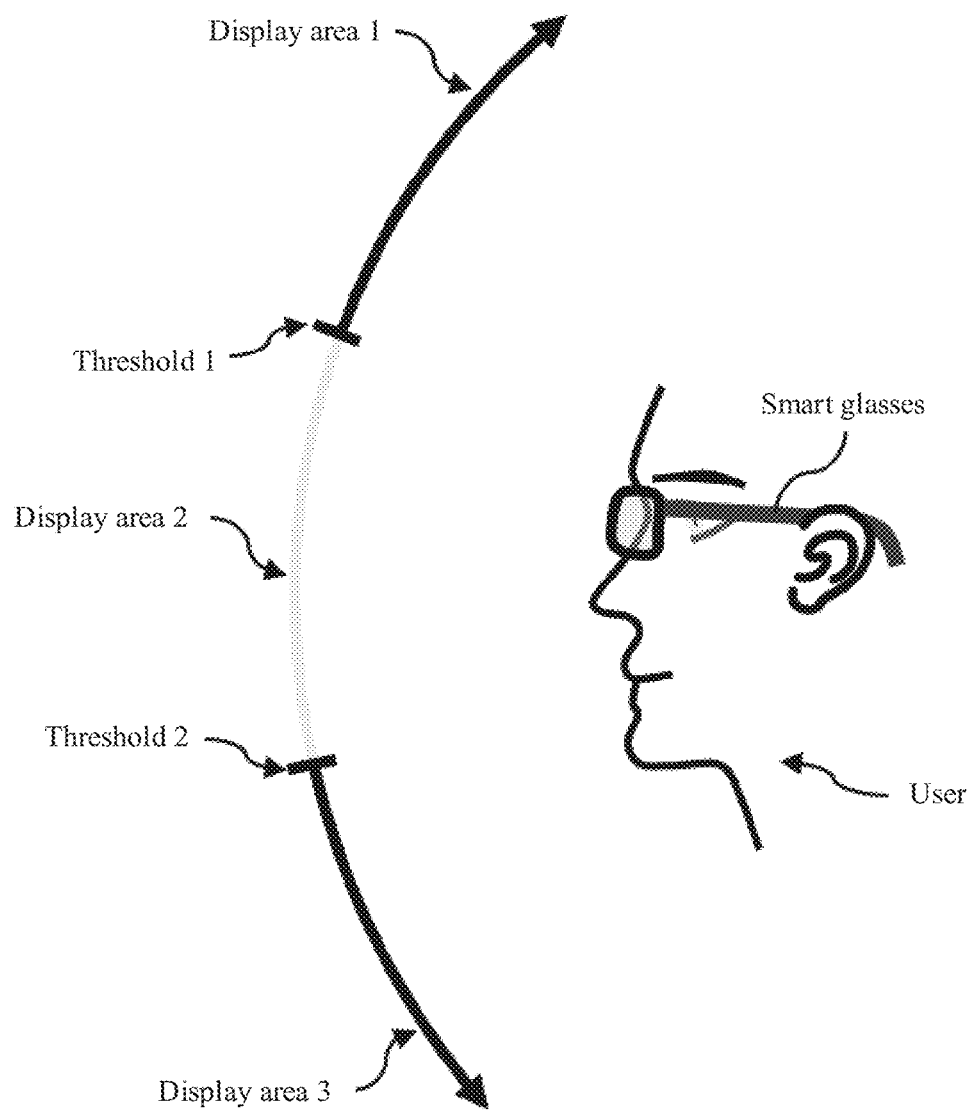
FIG. 9 is a schematic diagram of a turning direction existing when a user turns the head around an x-axis shown in FIG. 8.

FIG. 9 is a schematic diagram of a turning direction existing when a user turns the head around an x-axis shown in FIG. 8. As shown in FIG. 8 and FIG. 9, a corresponding display area 2 is used when the user horizontally looks at the front. The head may be raised up around the x-axis. When an angle between a location to which the head is raised and an initial location is greater than or equal to a threshold 1, a corresponding display area 1 is used. Alternatively, the head may be lowered down around the x-axis. When an angle between a location to which the head is lowered down and the initial location is greater than or equal to a threshold 2, a corresponding display area 3 is used. The display areas 1 to 3 may display different message images such as different applications. Specifically, the display area 1 may display a time point, the display area 2 may display weather, and the display area 3 may display an SMS message. Alternatively, the display areas 1 to 3 may display different information about a same application. Specifically, the display area 2 may display an icon of Messaging, the display area 3 may display an upper half of detailed content of the SMS message, and the display area 3 may display a lower half of the detailed content of the SMS message.

Figure 10:
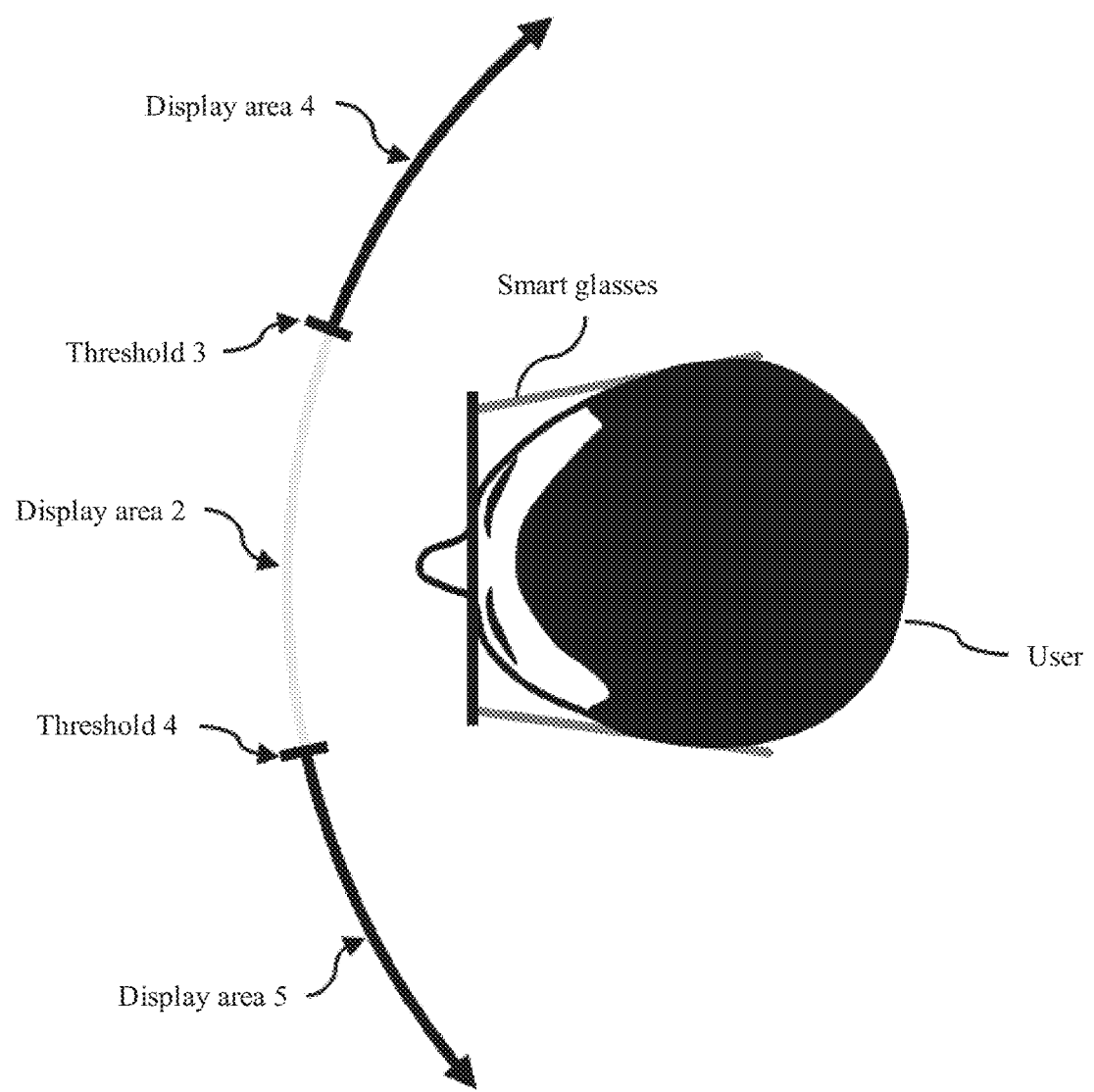
FIG. 10 is a schematic diagram of a turning direction existing when a user turns the head around a y-axis shown in FIG. 8.

FIG. 10 is a schematic diagram of a turning direction existing when a user turns the head around a y-axis shown in FIG. 8. As shown in FIG. 8 and FIG. 10, a corresponding display area 2 is used when the user horizontally looks at the front. The head may be turned to the right around the y-axis. When an angle between a location to which turning is performed and an initial location is greater than or equal to a threshold 3, a corresponding display area 4 is used. Alternatively, the head may be turned to the left around the y-axis. When an angle between a location to which turning is performed and the initial location is greater than or equal to a threshold 4, a corresponding display area 5 is used. The display areas 2, 4, and 5 may display different message images such as different applications. Specifically, the display area 2 may display weather, the display area 4 may display a time point, and the display area 5 may display an SMS message. Alternatively, the display areas 2, 4, and 5 may display different information about a same application. Specifically, the display area 2 may display an icon of Messaging, the display area 4 may display an upper half of detailed content of the SMS message, and the display area 5 may display a lower half of the detailed content of the SMS message.

According to the interaction method for smart glasses in the third embodiment of this application, the smart glasses are controlled, by detecting the turning direction of the head of the user, to perform screen flicking or page flipping. Screen flicking or page flipping may be performed when it is detected that the user turns the head. Alternatively, screen flicking or page flipping may be performed only when it is detected that a turning angle of the head of the user along a direction is greater than a specified threshold. In this way, the user can control the smart glasses without using the two hands. Operations are simple and convenient, thereby greatly improving user experience.

Figure 11:
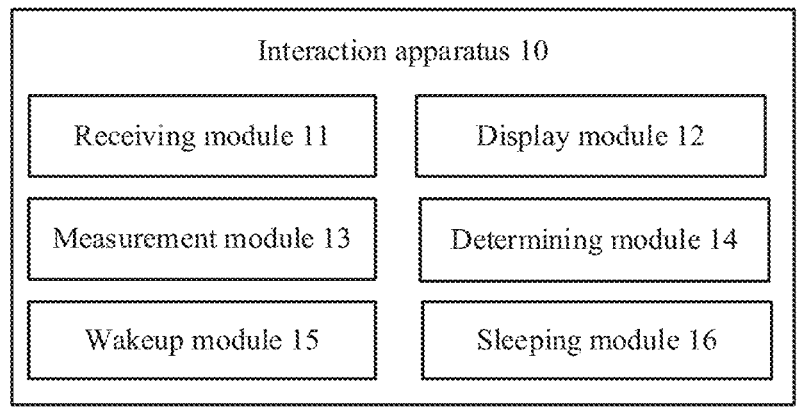
FIG. 11 is a block diagram of an interaction apparatus for smart glasses according to a first embodiment of this application.

FIG. 11 is a block diagram of an interaction apparatus for smart glasses according to a first embodiment of this application. As shown in FIG. 11, an interaction apparatus 10 includes a receiving module 11, a display module 12, a measurement module 13, and a determining module 14. The receiving module 11 is configured to receive a message sent by a communications device. The display module 12 is configured to display a prompt identifier of the message at an edge of a display area of the smart glasses. The measurement module 13 is configured to measure, within a specified time period, a first angle obtained after a user wearing the smart glasses turns the head along a first direction, for example, downward, where the first angle is an angle, along the first direction, between an initial location and a current location obtained after the smart glasses are turned, and the initial location is a location at which the smart glasses are located when the user horizontally looks at the front. The determining module 14 is configured to determine whether the first angle is greater than or equal to a first threshold. The display module 12 is further configured to: perform a screen flicking operation or a page flipping operation when the determining module 14 determines that the first angle is greater than or equal to the first threshold, to display, in the display area, detailed content obtained after the message is unfolded; and when the determining module 14 determines that the first angle is less than the first threshold, enable the prompt identifier to disappear.

The prompt identifier may be an icon or a word. The measurement module 13 can measure a turning angle and a turning direction of the head of the user wearing the smart glasses. The measurement module 13 may be an inertial measurement unit (Inertial measurement unit, IMU). The IMU may be one or a combination of sensors such as an accelerometer, a gyroscope, and a magnetometer.

The interaction apparatus 10 may further include a wakeup module 15, and the wakeup module 15 is configured to wake up the smart glasses when the smart glasses are in a sleep mode and receive the message. Optionally, the interaction apparatus 10 further includes a sleeping module 16, configured to: when the determining module 14 determines that the first angle is less than the first threshold, enable the smart glasses to enter the sleep mode. That is, when the first angle is less than the first threshold, the prompt identifier disappears. In this case, the smart glasses may still be in a wakeup mode. Alternatively, when the first angle is less than the first threshold, the smart glasses enter the sleep mode, and the prompt identifier disappears. Optionally, when the smart glasses are woken up again, the prompt identifier may still be displayed.

In addition, the display module 12 is further configured to: when the detailed content of the message is not completely displayed in the display area, perform a screen flicking operation or a page flipping operation on the detailed content of the message along a second direction, for example, upward, to display a non-displayed part of the detailed content in the display area. That is, when the detailed content of the message is long, after the user turns the head along the first direction, for example, downward, if the first angle is greater than or equal to the first threshold, a part of the detailed content obtained after the message is unfolded is displayed in the display area, and the screen flicking operation or the page flipping operation may be automatically performed on the detailed content of the message along the second direction, for example, upward, to display a remaining non-displayed part of the detailed content.

Alternatively, the measurement module 13 is further configured to: when the detailed content of the message is not completely displayed in the display area, measure a second angle obtained after the user turns the head along a third direction, for example, to the left or to the right. The second angle is an angle, along the third direction, between the initial location and a current location obtained after the smart glasses are turned. The determining module 14 is further configured to determine whether the second angle is greater than or equal to a second threshold. The display module 15 is further configured to: when the determining module 14 determines that the second angle is greater than the second threshold, perform a screen flicking operation or a page flipping operation on the detailed content of the message along the third direction, to display a non-displayed part of the detailed content in the display area. That is, when the detailed content of the message is long, after the user turns the head downward, if the first angle is greater than the first threshold, a part of the detailed content obtained after the message is unfolded is displayed in the display area. Then, if the user turns the head along the third direction, for example, to the left/right, and the second angle obtained after turning is greater than or equal to the second threshold, the screen flicking operation or the page flipping operation to the left may be performed on the detailed content of the message, to display a remaining non-displayed part of the detailed content. In this case, a direction in which the user turns the head is the same as a direction of screen flicking or page flipping. It can be understood that the direction in which the user turns the head may alternatively be different from the direction of screen flicking or page flipping. For example, the user turns the head to the left, so that a screen flicking operation or a page flipping operation to the right is performed on the detailed content of the message.

Figure 12:
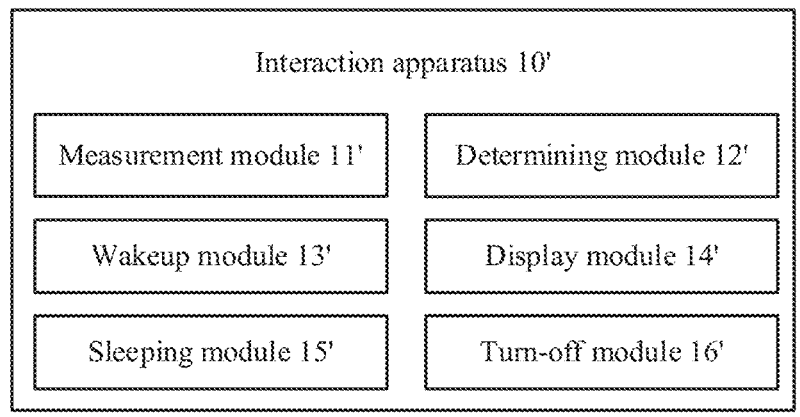
FIG. 12 is a block diagram of an interaction apparatus for smart glasses according to a second embodiment of this application.

FIG. 12 is a block diagram of an interaction apparatus for smart glasses according to a second embodiment of this application. As shown in FIG. 12, an interaction apparatus 10' includes a measurement module 11', a determining module 12', and a wakeup module 13'. The measurement module 11' is configured to: when the smart glasses are in a sleep mode, measure a first angle obtained after a user turns the head along a first direction, for example, upward, where the first angle is an angle, along the first direction, between an initial location and a current location obtained after the smart glasses are turned, the initial location is a location at which the smart glasses are located when the user horizontally looks at the front, and the smart glasses are in the sleep mode at the initial location. The determining module 12' is configured to determine whether the first angle is greater than or equal to a first threshold. The wakeup module 13' is configured to wake up a display of the smart glasses when the determining module 12' determines that the first angle is greater than the first threshold.

Further, the interaction apparatus 10' may further include a display module 14'. The display module 14' is configured to display corresponding first application information in a display area while the smart glasses are woken up. The first application information is preset.

In addition, the measurement module 11' is further configured to: when the smart glasses are in a wakeup mode, measure a first angle obtained after the user turns the head along a second direction, where the second direction is opposite to the first direction. The determining module 12' is further configured to determine whether the first angle is less than the first threshold. The interaction apparatus 10' may further include a sleeping module 15', configured to: when the determining module determines that the first angle is less than the first threshold, enable the smart glasses to enter the sleep mode.

Alternatively, the measurement module 11' is further configured to: when the smart glasses are in the wakeup mode, measure a second angle obtained after the user turns the head along a third direction, for example, to the left or right. The second angle is an angle, along the third direction, between the initial location and a current location obtained after the smart glasses are turned. The determining module 12' is further configured to determine whether the second angle is greater than or equal to a second threshold. The display module 14' is further configured to: when the determining module determines that the second angle is greater than or equal to the second threshold, perform a screen flicking operation or a page flipping operation along the third direction, to display detailed content of second application information or detailed content of the first application information in the display area. For example, an icon of a first application is displayed before switching, and detailed information of the first application is displayed after switching. Alternatively, the first application information is displayed before switching, and the second application information is displayed after switching.

In addition, the interaction apparatus 10' may further include a turn-off module 16'. The turn-off module 16' is configured to turn off the smart glasses, so that the smart glasses are not woken up when the first angle is greater than or equal to the first threshold after the head turns.

Figure 13:
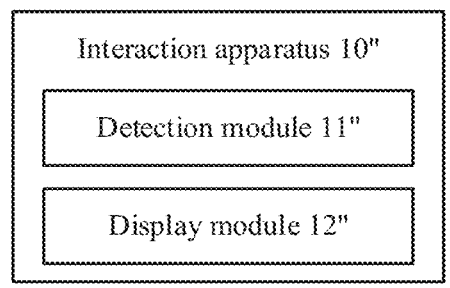
FIG. 13 is a block diagram of an interaction apparatus for smart glasses according to a third embodiment of this application.

FIG. 13 is a block diagram of an interaction apparatus for smart glasses according to a third embodiment of this application. As shown in FIG. 13, the interaction apparatus 10" includes a detection module 11" and a display module 12". The detection module 11" is configured to: when the smart glasses are in a wakeup mode, detect a turning direction of the head of a user wearing the smart glasses. The display module 12" is configured to perform screen flicking operations or page flipping operations in different directions based on the turning direction, to display different parts of a same message/a same piece of application information or different messages/different pieces of application information.

The smart glasses may be woken up in one of the following manners: using a voice instruction, tapping a touchpad, and performing a blinking action. The turning direction may include raising the head up, lowering the head down, turning the head to the left, turning the head to the right, swinging the head to the left, and swinging the head to the right. The screen flicking operation or the page flipping operation in the different directions may include performing screen flicking upward, performing screen flicking downward, performing screen flicking to the left, performing screen flicking to the right, performing screen flicking toward an upper left corner, and performing screen flicking toward an upper right corner. The plurality of turning directions are in a one-to-one correspondence with the plurality of screen flicking operations or page flipping operations. Specifically, screen flicking is performed upward by raising the head up. Screen flicking is performed downward by lowering the head down. Screen flicking is performed to the left by turning the head to the left. Screen flicking is performed to the right by turning the head to the right. Screen flicking is performed toward the upper left corner by swinging the head to the left. Screen flicking is performed toward the upper right corner by swinging the head to the right. In this case, the turning direction of the head of the user is the same as a direction of screen flicking. It can be understood that the turning direction of the head of the user may alternatively be different from the direction of screen flicking. For example, the user turns the head to the left, so that screen flicking to the right is performed on the detailed content of the message.

In addition, an embodiment of this application further provides smart glasses. The smart glasses include the interaction apparatus for smart glasses in the foregoing embodiment.

An embodiment of this application further provides smart glasses, including a memory, a processor, and a computer program that is stored in the memory and that may be run on the processor. When the processor executes the computer program, the interaction method for smart glasses is implemented.

A person of ordinary skill in the art may be aware that, in combination with the examples described in embodiments disclosed in this specification, units and algorithm steps can be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person of ordinary skill in the art may understand that all or a part of the steps in each of the foregoing method of embodiments may be implemented by a program instructing a processor. The foregoing program may be stored in a computer-readable storage medium. The storage medium may be a non-transitory (English: non-transitory) medium, for example may be a random access memory, a read-only memory, a flash memory, a hard disk, a solid-state drive, a magnetic tape (English: magnetic tape), a floppy disk (English: floppy disk), an optical disc (English: optical disc), or any combination thereof.

The foregoing descriptions are merely example specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An interaction method, comprising:
receiving, by a pair of smart glasses, a message of a first application from a communications device;
displaying, at an edge of a display area of the pair of smart glasses, a prompt identifier of the message;
performing, when detecting that a head of a user wearing the pair of smart glasses rotates in a first direction, a first screen sliding operation or first page turning operation to display detailed content of the message in the display area;
zooming out, when the pair of smart glasses displays a first display picture comprising the detailed content of the message and performs a second screen sliding operation, the first display picture to display a scaled-down first display screen;
sliding in, as the scaled-down first display screen slides out, a second display screen that includes different parts of the message than previously displayed or application information of an application different from the first application;
magnifying, when the scaled-down first display screen is completely slid out and a second display picture is completely slid in, the second display screen to generate an enlarged second display picture; and
displaying, by the pair of smart glasses, the enlarged second display picture.

2. The interaction method of claim 1, wherein, in response to the prompt identifier, when not detecting any operation of the user wearing the pair of smart glasses, the prompt identifier disappears.

3. The interaction method of claim 1, wherein the prompt identifier comprises one or more of an icon or a text.

4. The interaction method of claim 1, further comprising:
performing, when all of the detailed content cannot be displayed in the display area, a third screen sliding or a second page turning operation on the detailed content of the message in a second direction; and
displaying, in response to the third screen sliding or the second page turning operation, a previously undisplayed part of the detailed content of the message in the display area.

5. The interaction method of claim 1, wherein the interaction method further comprises waking up the pair of smart glasses when the pair of smart glasses receives the message.

6. The interaction method of claim 5, wherein the interaction method further comprises:
detecting, by the pair of smart glasses when the pair of smart glasses are woken up, a plurality of rotation directions of the head of the user wearing the pair of smart glasses;
performing, by the pair of smart glasses, a plurality of screen sliding operations or a plurality of page turning operations, wherein a direction of each of the plurality of screen sliding operations or the plurality of page turning operations is based on a rotation direction of the plurality of rotation directions; and
displaying, in response to the plurality of screen sliding operations or the plurality of page turning operations, different parts of the message or application message than previously displayed, different messages than previously displayed, or different application information than previously displayed.

7. The interaction method of claim 6, wherein the plurality of rotation directions comprises upward lifting, downward lowering, left turning, right turning, left swinging, and right swinging, wherein the screen sliding operation is one of the plurality of screen sliding operations, wherein the plurality of screen sliding operations comprises screen sliding up, screen sliding down, screen sliding left, screen sliding right, screen sliding upper left corner, and screen sliding upper right corner, and wherein the plurality of rotation directions is:
in a one-to-one correspondence with directions of the plurality of screen sliding operations; or
inconsistent with directions of the plurality of screen sliding operations.

8. The interaction method of claim 5, further comprising displaying, when the pair of smart glasses is woken up, first application information in the display area of the pair of smart glasses, wherein the first application information is preset.

9. The interaction method of claim 8, wherein the first application information is one or more of a type or content of the first application, and wherein the first application is one or more of a time application or a weather application.

10. A pair of smart glasses, comprising:
a memory configured to store a computer program;
a processor coupled to the memory, wherein the computer program, when executed by the processor, causes the pair of smart glasses to be configured to:
receive a message of a first application from a communications device;
display, at an edge of a display area of the pair of smart glasses, a prompt identifier of the message;
perform, when a head of a user wearing the pair of smart glasses rotates in a first direction, a first screen sliding operation or first page turning operation to display detailed content of the message in the display area;
zoom out, when displaying a first display picture comprising the detailed content of the message and performing a second screen sliding operation, the first display picture to display a scaled-down first display picture;
slide a second display screen in as the scaled-down first display picture slides out, wherein the second display screen includes different parts of the message than previously displayed or application information of an application different from the first application;
magnify, when the scaled-down first display picture is completely slid out and a second display picture is completely slid in, the second display screen to generate an enlarged second display picture; and display the enlarged second display picture.

11. The pair of smart glasses of claim 10, wherein, in response to the prompt identifier, when the user wearing the pair of smart glasses does not perform any operation, the prompt identifier disappears.

12. The pair of smart glasses of claim 10, wherein the prompt identifier comprises one or more of an icon or a text.

13. The pair of smart glasses of claim 10, wherein the pair of smart glasses is further configured to:

perform, when the detailed content of the message is not completely displayed in the display area, a third screen sliding or a second page turning operation on the detailed content of the message in a second direction; and display, in response to the third screen sliding or the second page turning operation, a previously undisplayed part of the detailed content of the message in the display area.

14. The pair of smart glasses of claim 10, wherein the pair of smart glasses is further configured to wake up when receiving the message.

15. The pair of smart glasses of claim 14, wherein the pair of smart glasses is further configured to:

detect, when woken up, a plurality of rotation directions of the head of the user wearing the pair of smart glasses;

perform a plurality of screen sliding operations or a plurality of page turning operations, wherein a direction of each of the plurality of screen sliding operations or the plurality of page turning operations is based on a rotation direction of the plurality of rotation directions; and display, in response to the plurality of screen sliding operations or the plurality of page turning operations, different parts of the message or application message than previously displayed, different messages than previously displayed, or different application information than previously displayed.

16. The pair of smart glasses of claim 15, wherein the plurality of the rotation directions comprises upward lifting, downward lowering, left turning, right turning, left swinging and right swinging, wherein the first screen sliding operation and the second screen sliding operation are of the plurality of screen sliding operations, wherein the plurality of screen sliding operations comprises screen sliding up, screen sliding down, screen sliding left, screen sliding right, screen sliding upper left corner, and screen sliding upper right corner, and wherein the plurality of rotation directions is:
in a one-to-one correspondence with directions of the plurality of screen sliding operations; or
inconsistent with directions of the plurality of screen sliding operations.

17. The pair of smart glasses of claim 16, wherein the pair of smart glasses is further configured to display, when waking up, first application information in the display area of the pair of smart glasses, and wherein the first application information is preset.

18. The pair of smart glasses of claim 17, wherein the first application information is one or more of a type or content of the first application, and wherein the first application is one or more of a time application or a weather application.

\* \* \* \* \*